(12) United States Patent
Rem et al.

(10) Patent No.: US 10,562,075 B2
(45) Date of Patent: Feb. 18, 2020

(54) SENSOR SEPARATION APPARATUS AND METHOD

(71) Applicant: URBAN MINING CORP B.V., Rotterdam (NL)

(72) Inventors: Peter Carlo Rem, Delft (NL); Martinus Cornelis Maria Bakker, Delft (NL); Simon Petrus Maria Berkhout, Delft (NL)

(73) Assignee: URBAN MINING CORP B.V., Rotterdam (NL)

( * ) Notice: Subject to any disclaimer, the term of this patent is extended or adjusted under 35 U.S.C. 154(b) by 118 days.

(21) Appl. No.: 15/532,847

(22) PCT Filed: Dec. 4, 2015

(86) PCT No.: PCT/NL2015/050841
§ 371 (c)(1),
(2) Date: Jun. 2, 2017

(87) PCT Pub. No.: WO2016/089209
PCT Pub. Date: Jun. 9, 2016

(65) Prior Publication Data
US 2018/0318882 A1    Nov. 8, 2018

(30) Foreign Application Priority Data
Dec. 5, 2014   (NL) ...................................... 2013925

(51) Int. Cl.
*B07C 5/342*    (2006.01)
*B07C 5/36*     (2006.01)
*B07C 5/34*     (2006.01)

(52) U.S. Cl.
CPC ................ *B07C 5/342* (2013.01); *B07C 5/34* (2013.01); *B07C 5/3412* (2013.01); *B07C 5/36* (2013.01); *B07C 2501/0054* (2013.01)

(58) Field of Classification Search
CPC ......... B07C 5/34; B07C 5/3412; B07C 5/342; B07C 5/36; B07C 2501/0054
See application file for complete search history.

(56) References Cited

U.S. PATENT DOCUMENTS 4,113,609 A   9/1978 King et al.
4,241,102 A   12/1980 McKinley et al.
(Continued)

FOREIGN PATENT DOCUMENTS

CN   1396845 A     2/2003
CN   101213621 A   7/2008
(Continued)

OTHER PUBLICATIONS

Office Action dated Nov. 27, 2018 issued in corresponding Chinese Patent Application No. 201580066104.5 with English translation.
(Continued)

*Primary Examiner* — Charles A Fox
*Assistant Examiner* — Kalyanavenkateshware Kumar
(74) *Attorney, Agent, or Firm* — Pillsbury Winthrop Shaw Pittman, LLP

(57) ABSTRACT

A separation apparatus, comprising an identifier arranged to identify the particles in a group of particles that have a specific property, an affinity modifier arranged to modify an affinity of the identified particles relative to that affinity of non-identified particles in an group, and a separator arranged to separate the particles in the group based on their difference in the affinity.

19 Claims, 1 Drawing Sheet

(56) References Cited

U.S. PATENT DOCUMENTS

| | | | | |
|---|---|---|---|---|
| 9,358,552 | B2* | 6/2016 | Friedlaender | B03C 7/04 |
| 9,409,210 | B2* | 8/2016 | Berkhout | B07B 13/10 |
| 9,839,919 | B2* | 12/2017 | Davis | B03C 5/02 |
| 2003/0132140 | A1* | 7/2003 | Oder | B03C 1/02 209/218 |
| 2005/0061713 | A1* | 3/2005 | Gates | B03C 7/02 209/128 |
| 2007/0007179 | A1* | 1/2007 | Ravishankar | B03C 1/01 209/212 |
| 2010/0065734 | A1 | 3/2010 | Morrison | |
| 2010/0261864 | A1* | 10/2010 | Miyasaka | B07C 5/34 526/351 |

FOREIGN PATENT DOCUMENTS

| | | |
|---|---|---|
| CN | 101693239 A | 4/2010 |
| CN | 101861214 A | 10/2010 |
| CN | 102574128 A | 7/2012 |
| EP | 2 343 136 B1 | 12/2013 |
| GB | 2229116 A | 9/1990 |
| WO | WO 03/066191 A1 | 8/2003 |
| WO | WO 2008/067589 A1 | 6/2008 |

OTHER PUBLICATIONS

International Search Report as issued in International Patent Application No. PCT/NL2015/050841, dated Aug. 12, 2016.
Written Opinion dated Jun. 19, 2019 issued in corresponding Singapore Patent Application No. 11201704402S.
Second Office Action dated Aug. 12, 2019 issued in corresponding Chinese Patent Application No. 201580066104.5 with English translation.

\* cited by examiner

SENSOR SEPARATION APPARATUS AND METHOD

CROSS-REFERENCE TO RELATED APPLICATIONS

This is the U.S. National Stage of PCT/NL2015/050841, filed Dec. 4, 2015, which in turn claims priority to Netherlands Application No. 2013925, filed Dec. 5, 2014, the entire contents of both applications being incorporated herein by reference in their entireties.

The invention generally relates to separation of particles, in particular in recycling.

Separation apparatus are known in the prior art and they are typically used in raw materials processing for the classification of mixed streams of particles of recycling material into streams with particles of different types of material. The known sensor separation apparatus comprises an identifier, in particular a sensor that analyses a group of particles in order to assess the type of each individual particle. After the particles of the relevant type have been identified by the sensor, a separator is activated that physically separates the identified particles from the group of particles, for example a series of nozzles is actuated so that they initiate jets of air that eject the identified particles from the stream such that they are separated from the group of particles.

A disadvantage of the sensor separation apparatus known in the art is that they are not very accurate. In particular, the air jets will accidentally hit and eject not just the identified particles, but also neighboring non-identified particles which may be of a different type. Especially, when the particles are closely arranged in the group this decreases the accuracy of the known sensor separation apparatus. A solution in the art is to arrange the particles very sparsely in the group to avoid accidentally hitting and ejecting neighboring particles by the jet of air. However, this lowers the capacity and affects the economy of the process. For example, economic recycling of a mixed stream of smaller particles of physically similar or identical particles, e.g. shredded particles of a plastic material, e.g. PET or PE, having different colors and a maximum dimension of several mm, e.g. 10 mm or less.

EP2343136B1 discloses a separation method intended to extract a target, using viscosity of a liquid, from a separation subject in which the target and a non-target are mixed. The disclosed method comprises distinguishing the target from the non-target; obtaining positional information of the target distinguished in the distinguishing, attaching a liquid to the target based on the positional information and extracting the target from the separation subject by bringing a catch member into contact with the separation subject such that viscosity of the liquid causes the target to adhere to the catch member. In order to let the viscosity of the liquid cause the target to adhere to the catch member, an amount of the liquid attached to the target, the viscosity of the liquid, a thickness of the target, an area of the target, and density of the target need to satisfy multiple expressions. A stainless steel plate a silicon rubber plate or a woven wire made of stainless steel are proposed as catch member. The length of time for which the catch member was placed on the separation subject is in the order of three seconds. This is a relatively long time. Also sufficient pressure is to be exerted by the catch member in order to enable that viscosity of the liquid causes the target to adhere to the catch member.

The invention aims at alleviating one or more of the aforementioned disadvantages. In particular, the invention aims to provide a sensor separation apparatus with improved accuracy and efficiency. To that end, the invention provides for a separation apparatus, comprising an identifier arranged to identify the particles in a group of particles that have a specific property, an affinity modifier arranged to modify an affinity of the identified particles relative to that affinity of non-identified particles in the group, and a separator arranged to separate the particles in the group based on their difference in the affinity.

By providing the separation apparatus with an affinity modifier, it may be achieved that only the identified particles that are, e.g. commercially relevant, may be separated from the group based on a provided difference in the affinity without disturbing neighboring non-identified particles. This way, accidentally separating a non-identified particle may be counteracted, and thus the accuracy of separation may be increased. Further, the affinity of the particle may be, e.g. the tendency of the particles to affix onto the separator, and, preferably, the affinity modifier increases this tendency. For example, the affinity modifier may be arranged to modify the force of attraction or attachment force of the identified particles relative to that force of attraction or attachment force of non-identified particles in the group, such that identified particles may be attracted onto the separator. The tendency may be increased by means known in the art, for example, increasing the adhesiveness of the particles, but also by statically charging the particles or using magnetization.

It is noted that the affinity modifier is arranged to modify the affinity of the identified particles relative to that affinity of non identified particles. This may e.g. comprise the following four situations: (1) the identifier identifies particles that are commercially relevant and the affinity modifier may then be arranged to change the affinity of the identified particles such that a separator can separate the identified particles from the group, e.g. by picking or engaging the particles, or (2) the identifier identifies particles that are commercially relevant and the affinity may then be arranged to change the affinity of the non-identified particles such that the separator can separate the non-identified particles from the group, or (3) the identifier identifies particles that are not commercially relevant. The affinity modifier may then be arranged to change the affinity of the non-identified particles such that the separator can separate the non-identified particles from the group, or (4) the identifier identifies particles that are not commercially relevant and the affinity modifier may then be arranged to modify the affinity of the identified non-commercially relevant particles such that the separator can separate the identified non-commercially relevant particles from the group. It is noted that the identifier selectively and individually engages the particles, i.e. each particle of the group is being engaged and identified by the identifier.

By providing the separation apparatus with a separator, it may be achieved that, e.g. the identified particles with a modified affinity may be selectively separated from the group, and the non-identified particles may remain undisturbed. Consequently, the particles may then be arranged more closely together, and thus increasing the capacity and the economy of the process. As an option, it is noted that once the separator has separated the identified particles from the group, a second separator or more separators arranged in one go may additionally be included to separate remaining particles of a different type of material, color, or size, and thus more than one type of particle may be separated from a single sorter system.

The particles in the group may be small particles of, e.g. plastic, metal and/or wood, with a diameter that may range between 1-20 mm.

The identifier may identify the particles in the group on the basis of a specific property, e.g. material type, weight, color, shape and/or size. Specifically, non-physical property, e.g. same density but different color, or size out of a specified range. For example, a particle of the group may be identified with the specific property of color while another particle of the group may be identified with the specific property of size. It is noted that the identifier may be arranged to identify multiple specific properties, however, it is also possible to have multiple identifiers aligned in a row, each identifier arrange to identify at least one specific property.

The separation apparatus may further comprise a layerizer arranged to bring the group of particles in layer. This way, a planar array of particles may be provided, e.g. a curtain or a bed, so that identification can be facilitated and the particles may be provided with a known spatial relation. This way, it may also be prevented that too many particles stick onto each other and/or avoiding that, e.g. two or more particles are overlapping each other such that the identifier is unable to identify the lower particles.

The group of particles may be brought in a layer arrangement and/or bed by, for example, forcing the group of particles through a channel, sieve, groove, slit, slot or by means of a sweeper. Further, it is noted that the layerizer may also comprise a jig causing a pulsation such that the particles may be in a layer arrangement and/or bed and thus the identifier can easily identify at least one specific property of the particles.

Preferably, the layerizer provides the particles in the layer with a known, preferably constant, spatial relation, e.g. using a belt conveyor with compartmentalized belt surface, or a belt surface with pre-impressed spatially arranged electrostatic charges that temporarily fixate singular received particles until they reach the separator in the layer between the identifier and the affinity modifier. By doing so, the accuracy of the affinity modifier may be further increased, and accidentally modifying an affinity of the non-identified particles may be prevented.

The layerizer may comprise a conveyor belt surface on which the particles are deposited in a planar layer. The particles may, for example be in a top layer wherein the particles are non-overlapping, or in a monolayer. The particles may be conveyed along the identifier, affinity modifier and the separator with a velocity that may range in between 0.5-8 m/s, preferably 1-3 m/s and more preferably of about 2.5 m/s.

The identifier may be a sensor, e.g. optical sensor and/or an image processing device, e.g. color camera (RGB) for visual assessment, IR camera for temperature and shape assessment, near-infrared (NIR) camera for chemo-spectral and shape assessment (e.g. plastic type), X-ray methods such as X-ray Fluorescence (XRF) for elemental assessment or X-ray transmission for density and shape assessment, or laser induced breakdown spectroscopy (LIBS) for elemental assessment. The optical sensor may for example have a resolution in time of better than 0.5 ms and a resolution in space of better than 0.5 mm. Therefore, the optical sensor may accurately define the position, size and/or shape of particles passing by.

The affinity of the identified particles which may be modified by the affinity modifier may be e.g. the adhesiveness e.g. using water or spray able adhesive on plastic flakes, electric static charge or magnetic behavior of the identified particles. In particular, the affinity modifier may modify the affinity of the identified particles by applying affinity modifying particles to the identified particles, wherein the modifying particles may be charged particles, e.g. electrons to statically charge the identified particles.

Preferably, the affinity modifying particles may be material particles, wherein the affinity changing particles may form a coating surface layer onto the identified particles. Additionally or alternatively, the affinity changing particles may form, at least partially, a coating surface layer onto the identified particles, i.e. onto a surface of the identified particles that is facing the affinity modifier. For example, modifying particles may be discharged from the modifier from above the conveyor such that the modifying particles may adhere onto the surface of the particles, forming a sticky, moisturized and/or magnetic coating surface.

The affinity modifying particles discharged from the affinity modifier may be liquid droplets and/or powder particles. The affinity modifier may comprise jets, e.g. jet printer heads. When the affinity modifier discharges liquid droplets, this may for example be oil, alcohol, but preferably water to moisturize the identified particles. The identified particles may then be covered by a water layer of approximately 10-20 microns. The liquid droplets on the surface of the identified particles may then form a moisture bridge between the identified particles and the separator while the non-identified particles remain substantially dry. Optionally, it is also possible that the liquid droplets on the surface of the identified particles form a moisture bridge between the identified particles and a second material, e.g. powder particles, wherein the powder particles may be discharged by, for example, another affinity modifier, e.g. powder spray, after the identified particles have been moisturized.

The affinity modifier is arranged for individual engagement of particles. The affinity modifier may deliver 50000 droplets per second per valve, wherein each droplet may have a diameter smaller than 100 micron and preferably 40 micron. The valves may be spaced from each other with a distance of about 0.05 mm or more. In particular, the valves are preferably arranged for providing droplets at a resolution of 100 droplets per inch—or 39 to 40 droplets per centimetre.

It is noted that multiple modifiers or one modifier having multiple valves may be arranged in a row that is transverse to the conveyor direction, or they may be partly co-moving in the direction of the conveyor to eliminate the relatively motion between the modifier and particles during the modifying action (e.g. spraying jets mounted on a device rotating opposite to the conveyor belt). Each valve and/or modifier may contain different modifying particles to be discharged. By having the modifier that is able to deliver 50000 droplets per second per valve, it may be achieved that the accuracy between the sensor and the separator may be better coordinated. In particular, the resolution of the separator may be about 0.4 mm and thus it easily matches the resolution of the identifier of 0.5 mm and therefore the separator may operate with the same accuracy as the identifier.

It is noted that besides the above mentioned fluids, it is also possible that the modifier discharges glutinously fluids onto the identified particles, e.g. starch.

The powder particles may be a magnetic powder, e.g. industrial Ferrosilicon, preferably spherically shaped. Preferably, the modifier discharges powder particles after the particles have been at least partially covered by liquid droplets. For example, 40-150 micron magnetic powder particles may be added per moisturized identified particles such that the powder will stick onto the moisturized identified particles.

Preferably, the affinity modifier comprises a printer head wherein the printer head may be of the type inkjet printer for discharging the liquid droplets. The affinity modifier may further comprise a powder spray arranged to discharge the powder particles, e.g. Ferrosilicon. Thus, the printer head is arranged to discharge water droplets onto the identified particles after which the powder spray sprays spherically shaped Ferrosilicon on the moisturized identified particles. The droplets may thus form a water bond, with a strength comparable with a yellow sticky note, between the identified particles and the Ferrosilicon. By providing the identified particles with liquid droplets and a layer of Ferrosilicon, the identified particles may be selectively attracted to a magnet or a magnetizable material.

The separator may have a contact surface onto which the identified particles are affixed thereon. The separator may be arranged to individually engage the particles. The separator may be an active separator i.e. a separator that is mechanically driven to ensure that the contact surface engages the identified particles and/or the group of particles. However, it is also possible to have a passive separator, i.e. wherein the identified particles and/or group of particles fall onto the contact surface of the separator. The contact surface may be coated with a hydrophilic material arranged to attract the moisturized particles. The contact surface may also be a magnet or at least is coated with a magnetizable layer arranged to interact with the magnetic spherically powder particles that may be on the surface of the identified particles such that the identified particles may be attracted by the separator, or affix onto it. An advantage of a separator having a contact surface onto which the identified particles are affixed, in particular with the surface coated with a hydrophilic material and/or the separator having magnetic properties, is that no pressing of the separator on the identified particles is required for adherence of the particles to the separator. This enables short processing times. And in particular in the case of affixing by means of magnetic attraction, an additional advantage is that particles other than identified particles are not in contact with the separator, which reduces the odds of non-identified particles 6 to be picked up by the separator.

Preferably, the separator may be a mechanical pick up device having a contact surface that contacts the group of particles for picking up the identified particles. The separator may, for example, be a drum with a rotating axis transverse to the conveyor direction. The drum may have a contact surface that is coated with a magnetizable layer or with hydrophilic fibrous material with fibers having a size that may range in between 100-500 micron diameter and is preferably about 300 micron diameter. The fibers may have a rounded top and these fibers may be moved up and down individually fast enough to connect to moisturized particles such that the moisturized particles are affixed onto the fibers.

The invention further relates to a use of a printer head for separation of identified particles from a group of particles.

The invention further relates to a method for separation of particles from a group of particles, comprising the steps of:
supplying an group of particles in an arrangement, wherein the group of particles comprises particles with different properties, e.g. material, color, shape and/or size;
identify particles in the group of particles that have a specific property;
modify an affinity of the identified particles relative to that affinity of non-identified particles in the group with an affinity modifier;
separate the particles in the group based on their difference in the affinity with a separator.

When fine powder particles, e.g. ferrosilicon have been applied by the modifier to the identified particles, the method may further comprise a recovering step after the separation step, wherein the wetted particles with ferrosilicon powder on their surface are dried and/or brought into a magnetic field with a sufficiently high gradient to separate the magnetic powder from the surface of the identified particles such that ferrosilicon powder particles may be recovered.

It is noted that in the method for separation, the identifier may also be a human that identifies the particles to be separated and marks them with a marker.

The invention will be further elucidated on the basis of an exemplary embodiment which is represented in a drawing. In the drawings.

It is noted that the figures are merely schematic representations of a preferred embodiment of the invention, which is given here by way of non-limiting exemplary embodiment. In the description, the same or similar part and elements have the same or similar reference signs.

Figure 1:
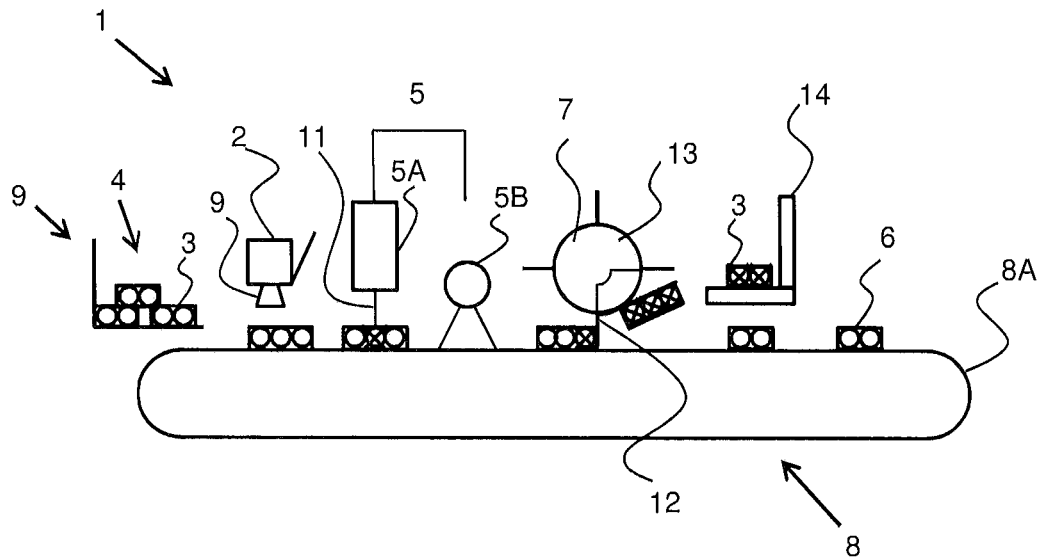
FIG. 1 shows a first schematic view of the separation apparatus.
Figure 2:
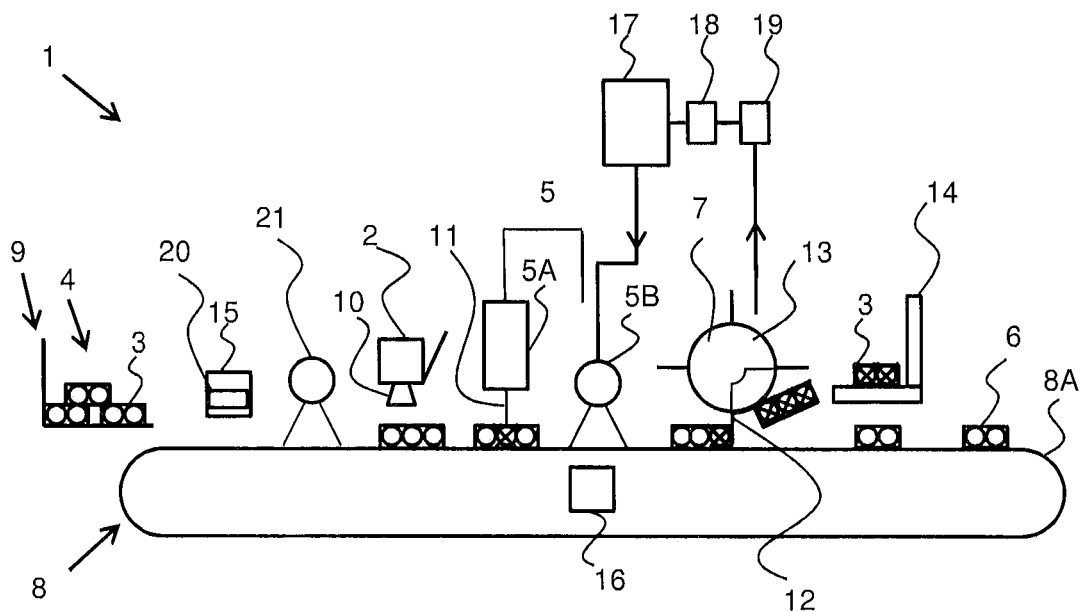
FIG. 2 shows a second schematic view of the separation apparatus.

In FIG. 1 is shown a separation apparatus 1 comprising an identifier 2 arranged to identify the particles 3 in a group of particles 4 that have a specific property. FIG. 2 shows the separation apparatus 1 comprising optional further elements.

The separation apparatus 1 is arranged for individual engagement of particles. The particles may be small particles such as shredded PE, PP or PET of different colors or different grades with a diameter size that may range between 1-20 mm. An affinity modifier 5 is provided that is arranged to selectively modify an affinity of the identified particles 3 relative to that affinity of non-identified particles 6 in a group 4, and a separator 7 is arranged to separate the particles in the group 4 based on their difference in the affinity. The specific property that is measured by the identifier 2 may be, e.g. a type of material, weight, color, shape and/or size.

The sensor separation apparatus 1 in the example further comprise a layerizer 8 arranged to bring the group of particles 4 in layer, and preferably provides the particles 4 in the layer with a known constant spatial relation in the layer between the identifier 2 and the affinity modifier 5. Worded differently, the particles 4 are by the layerizer 8 provided such that the travel time from the identifier 2 and the affinity modifier 5 is known. This allows operation of the identifier 2 and the affinity modifier 5 to be synchronized.

The layerizer 8 in this embodiment comprises a conveyor belt surface 8A on which the particles are deposited in a planar layer. The conveyor belt surface 8A preferably has a high-friction surface, for example comprising synthetic and/or natural rubber. As shown in FIG. 1 the group particles 4 are being fed onto the conveyor belt surface 8A by a feeder 9. The group particles 4 may be fed onto the conveyor belt as a continuous curtain of particles or as sections with a predetermined distance. Optionally, the group particles 4 first passes magnetic scrap remover 15 for removing particles in the particle feed having magnetic properties. The magnetic scrap remover may comprise a magnet 20 for attracting particles having magnetic properties, like particles comprising ferromagnetic metal. Particles comprising ferromagnetic metal may comprise such ferromagnetic metal in a pure form or in a compound, like a salt or other.

The identifier 2 is in FIG. 1 embodied as an optical sensor 10 wherein it is positioned above the layerizer 7 to identify the group particles 4 that have a specific property. For example, the identifier 2 is arranged to identify the color of the particles 4 in a stream of clear and in particular translucent particles. The identifier 2 is also arranged to identify a specific type of PP via a marker provided in the PP material. Furthermore, the identifier 2 is arranged to identify the position of the particles on the conveyor belt surface 8A.

After the particles 4 have passed along the identifier 2, the affinity modifier 5 modifies the affinity of the identified particles 3 by applying affinity modifying particles 11 to the identified particles 3. The modifying particles 11 is, for example discharged from above the conveyor belt surface 8A such that the affinity modifying particles 11 form a coating surface layer onto the identified particles 3. The affinity modifying particles 11 are preferably discharged with a component of their velocity parallel to the motion of the conveyor belt surface 8A. In this way, it may be avoided that identified particles 3 are missed by the particles by time of flight effects related to variations in the height of the identified particles above the conveyor belt surface 8A.

The affinity modifying particles 11 may in FIG. 1 be liquid droplets and/or powder particles wherein the liquid droplets is in this example is water to moisturize the identified particles to form a moisture bridge between the identified particles 3 and the separator 7. The water may be provided with a minor amount of additives to improve the electrical conductivity. A reason for this is that some printers require the liquid to be disposed to have a certain electrical conductivity for properly discharging the liquid. This applies not only to ink, but also to water in case water is to be discharged by the printer. Optionally, it also possible that after the identified particles 3 have been moisturized by liquid droplets, a second modifier 5B or the same modifier 5A discharges a second material, preferably powder particles. The powder particles in FIG. 1 may be magnetic powder particles, e.g. industrial ferrosilicon wherein they are preferably spherically shaped such that the identified particles 3 may be engaged individually and/or lifted by the separator 7.

Typically, more than one ferrosilicon particle is discharged per identified particle 3. Preferably, a significant amount of ferrosilicon particles is discharged per identified particle 3. In particular, the amount of ferrosilicon particles to be discharged is at least 1% and preferably more than 4% of the mass of an identified particle 3. For preventing any powder particles freely moving over the conveyor belt surface 8A, the conveyor belt surface 8A may comprise grooves oriented substantially perpendicular to a direction of movement of the conveyor belt surface 8A. Preferably, the grooves are less than one millimeter. Preferably, the particles are discharged with a speed component perpendicular to the conveyor belt surface 8A of less than 1 m/s. In addition, a speed component parallel to the conveyor belt surface 8A is tuned to the velocity of the belt surface 8A.

The affinity modifier 5 is in FIG. 1 embodied as a printer head 5A and/or a powder spray, e.g. Ferrosilicon spray 5B. With the affinity modifier 5 comprising a printer head 5A for distributing water or another liquid for moisturizing the liquid droplets, the printer head 5A is arranged for providing droplets smaller than 100 micron, preferably 30 to 50 micron. The droplets are preferably provided at a resolution of at least 100 droplets per inch—or 39 to 40 droplets per centimetre. At this resolution, it is possible to deposit liquid only on identified particles 3. Additionally to this, powder particles may be discharged on either identified particles 3 only or on all particles. On identified particles 3, powder particles are bound by the liquid on the identified particles 3. Powder particles on other particles 6 may be removed, for example by means of blowing or a magnetic field. Alternatively, in an embodiment in which liquid as well as powder particles are discharged, liquid is deposited at all particles 4 on the conveyor belt and the powder particles are only discharged on the identified particles 3.

If identified particles are moisturized, this may be done in a blanket fashion, deploying a blanket or substantially continuous film of liquid on either all particles 4 or identified particles 3. Alternatively, liquid is discharged on specific areas. This may for example be established by depositing the liquid in lines. These lines may be parallel to the motion of the conveyor belt, perpendicular to the motion of the conveyor belt or under an angle relative to the motion of the conveyor belt.

In certain embodiments, it may be desired to pretreat the particles 4 for improving adherence between affinity modifying particles and the group particles 4. To this purpose, a pre-treatment module 21 (FIG. 2) is provided for pretreating the group particles 4. If the affinity modifying particles comprise water, it may be preferred to improve hydrophilic properties of the group particles 4. In one specific embodiment, a very thin layer (1 to 10 nanometers) of calcium carbonate is applied to the group particles. Such layer of calcium carbonate may be applied by exposing the group particles to water having a sufficiently high hardness (measured, for example, in German degrees) at a temperature of at least 80 degrees centigrade. Exposure may be provided by means of spraying or submersion. Submersion is preferably done for at least 30 seconds, in water of sufficient hardness, at a temperature of at least 80 degrees. Alternatively or additionally, a coating of for example hexamethyldisilazane and/or other hydrophobic substances may be provided as a coating for the group particles 4. The hydrophilic coating may be applied on all particles or on identified particles 3 only.

In a region around the ferrosilicon spray 5B—or other discharge unit for discharging particles having magnetic properties—a weak magnetic field may be applied. The field lines of the magnetic field are provided substantially parallel to the direction of movement of the layerizer 8 and the conveyor belt surface 8A in particular. The intensity of the magnetic field preferably ranges from 0.01 Tesla to 0.05 Tesla. As an effect of the magnetic field, rolling of the powder particles on the conveyor belt surface 8A as a result of damping by magnetic hysteresis is suppressed. This is because the magnetization of a rolling particle in a unidirectional field creates a loss of mechanical energy into heat. Furthermore, the applied weak magnetic field also has the effect to deposit the powder particles onto the wetted particles arranged in short strings for example, three powder particles in a row. This is favorable for the later magnetic extraction of the scrap particles and allows a reduced use of magnetic powder.

The separator 7 has a contact surface 12 onto which identified particles 3 are affixed thereon such that they can be separated from the group particles 4. The separator 7 individually engages particles for separation. Preferably, the separator 7 is a mechanical pick up device which contact surface 12 contacts the group of particles 4 for picking up the identified particles 3. As shown in FIG. 1 the separator 7 is embodied as a drum 13 having a rotating surface transverse to the conveying direction. Worded differently, the axis of rotation of the drum 13 is perpendicular to the conveying direction. The contact surface 12 of the drum 13 is in this example coated with a hydrophilic fibrous material such that the identified moisturized particles may be affixed thereon.

Further, it is also possible that the separator 7 is a magnet or that its contact surface 12 is a magnet, has magnetic properties, or at least is coated with a magnetizable layer to separate the identified particles 3 which have been coated with magnetic powder. In addition, if the separator 7 is a magnet or its contact surface 12 is a magnet, or at least is coated with a magnetizable layer, the separator may be used to recover particles having magnetic properties that may have been discharged upstream of the conveyor belt surface 8A. This may be particles that are adhered to identified particles 3 and/or particles not adhered to identified particles 3, but present on the conveyor belt surface 8A and/or present on non-identified particles 6 not having been provided with liquid. The particles thus recovered are fed back to a reservoir 17 (FIG. 2), allowing for reuse of the particles. Before reuse, the particles may be de-magnetized by means of a de-magnetizer 18 (FIG. 2) and/or dried, for example in a fluidized bed 19 (FIG. 2). It is noted in other embodiments, the order of the reservoir 17, the de-magnetizer 18 and the fluidized bed 19 may be different.

Further, in FIG. 1 and FIG. 2 is shown that a second conveyor 14 may be provided to convey the identified particles 3 away from the group particles 4 after the identified particles 3 have been separated.

As for the purpose of this disclosure, it is pointed out that technical features which have been described may be susceptible of functional generalization. It is further pointed out that—insofar as not explicitly mentioned—such technical features can be considered separately from the context of the given exemplary embodiment, and can further be considered separately from the technical features with which they cooperate in the context of the example.

It is pointed out that the invention is not limited to the exemplary embodiments represented here, and that many variations are possible. For example, the identifier may also be an identifier station comprising multiple identifiers arranged in a row or the separation apparatus may comprise multiple identifiers stations, preferably also arranged in a row. There may also be an affinity modifier station or a separator station.

Further, it is noted that the separator and the affinity modifier may be accommodated in a single device wherein modifying the affinity of identified particles and separation may be single action and may take place at the same time at a same position.

It is further noted that multiple separation apparatus may be placed in one go, e.g. above a conveyor, such that multiple different particles may be separated from a single stream of particles.

These and other embodiments will be apparent to the person skilled in the art and are considered to lie within the scope of the invention as formulated by the following claims

The invention claimed is:

1. A separation apparatus, comprising:
   an identifier arranged to identify the particles in a group of particles that have a specific property;
   an affinity modifier arranged to modify an affinity of the identified particles relative to that affinity of non-identified particles in an group;
   a separator arranged to separate the particles in the group based on their difference in the affinity; wherein:
   the affinity modifier modifies the affinity of the identified particles by applying affinity modifying particles to the identified particles; and
   the affinity modifying particles comprise liquid droplets to moisturize the identified particles to form a moisture bridge between the identified particles and the separator.

2. The apparatus according to claim 1, further comprising a layerizer arranged to bring the group of particles in layer.

3. The apparatus according to claim 2, wherein the layerizer provides the particles in the layer with a known, preferably constant, spatial relation in the layer between the identifier and the affinity modifier.

4. The apparatus according to claim 2, wherein the layerizer comprises a conveyor belt surface on which the particles are deposited in a planar layer.

5. The apparatus according to claim 1, wherein the identifier is an optical sensor.

6. The apparatus according claim 1, wherein the affinity modifying particles form a coating surface layer onto the identified particles.

7. The apparatus according to claim 1, wherein the affinity modifying particles further comprise powder particles.

8. The apparatus according to claim 7, wherein the powder particles comprise magnetic powder particles that are spherically shaped.

9. The apparatus according to claim 1, wherein the affinity modifier comprises a printer head.

10. The apparatus according to claim 1, wherein the specific property is a type of material, color, shape and/or size.

11. The apparatus according to claim 1, wherein the separator has a contact surface onto which identified particles are affixed thereon.

12. The apparatus according to claim 11, wherein the contact surface is coated with hydrophilic fibrous material.

13. The apparatus according to claim 11, wherein the contact surface comprises a magnet or at least is coated with a magnetizable layer.

14. The apparatus according to claim 1, wherein the separator comprises a mechanical pick up device having a contact surface that contacts the group of particles for picking up the identified particles.

15. The apparatus according to claim 1, wherein the separator comprises a drum.

16. The apparatus according to claim 1, wherein the group of particles comprises small particles with a diameter size of 1-20 mm.

17. The apparatus according to claim 1, wherein the affinity modifying particles comprise water droplets.

18. A method for separation of particles from a group of particles, comprising the steps of:
   supplying an group of particles in an arrangement, wherein the group of particles comprises particles with different properties, the different properties comprising one or more of: material, color, shape and size;
   identify particles in the group of particles that have a specific property;
   modify an affinity of the identified particles relative to that affinity of non-identified particles in the group with an affinity modifier;
   separate the particles in the group based on their difference in the affinity with a separator; wherein:
   the affinity modifier modifies the affinity of the identified particles by applying affinity modifying particles to the identified particles; and
   the affinity modifying particles comprise liquid droplets to moisturize the identified particles to form a moisture bridge between the identified particles and the separator.

19. The apparatus according to claim 8, wherein the powder particles comprise industrial ferrosilicon.

* * * * *